March 25, 1930.  G. E. WHITWELL  1,752,223

BACKRUN METHOD OF OPERATING GAS PLANTS

Filed April 26, 1923

Inventor
George E. Whitwell
By Munson H. Lane
Attorney

Patented Mar. 25, 1930

1,752,223

UNITED STATES PATENT OFFICE

GEORGE E. WHITWELL, OF SEATTLE, WASHINGTON, ASSIGNOR TO YOUNG-WHITWELL GAS PROCESS COMPANY, OF TACOMA, WASHINGTON, A CORPORATION OF WASHINGTON

BACK-RUN METHOD OF OPERATING GAS PLANTS

Application filed April 26, 1923. Serial No. 634,811.

The invention relates to a process for making combustible gas, and while it is particularly applicable to the manufacture of carburetted water gas in the ordinary three shell carburetted water gas plant, with back run connections, the invention is not limited to the manufacture of carburetted water gas alone. Acknowledgment is made of the patent to Daniel J. Young, Number 1,468,190, granted September 18, 1923, and his application, Serial Number 570,207, filed June 22, 1922, the present invention being in the nature of a development of the inventions of his patent and application.

The process is adapted for use in connection with many existing forms of apparatus, especially water gas plants including the usual generator, carburetor and superheater, and is herein particularly described with reference to an apparatus claimed in a copending application of Frank W. Steere, which forms the subject of his application for patent, Serial Number 637,159, filed May 7, 1923.

In the accompanying description of the process and apparatus, where reference is made to a carburetter and superheater, it will be understood, that where carburetted water gas is not being made these structures function principally as heat interchanges, and may be referred to respectively as primary and secondary heat interchangers.

According to my process the fuel bed of the generator is first blasted in the manner customary in water gas practice, and the resulting heat stored in the carburetter and superheater, or heat interchangers. Then a gas is introduced into the set at such point in the system that it is highly heated prior to its entrance into the fuel bed of the generator.

This gas is passed through the entire fuel bed and is withdrawn directly from the generator, and a portion thereof separated, and repassed preferably with steam, successively through the heat interchangers and through the entire length of the fuel bed of the generator. The resulting combustible gas is then withdrawn directly from the generator and passed without further heating to a place of storage or use. A carburetting cycle may be included in the process if desired.

As stated above, the apparatus employed is preferably the usual three shell water gas set with modifications which will appear from the further detailed description of the apparatus, in connection with which my process may be employed.

An important object of the invention is to pass steam through the water gas plant as a whole in a direction reverse to that of the normal flow of gas, the steam being superheated in passing through the superheater and carburetter, and being, therefore, in the most favorable condition to react with the fuel in the generator for the manufacture of water gas. This operation takes the place of the so-called "down run" of steam which is expensive and wasteful of heat by reason of the fact that the down run steam has not been superheated. The backrun superheats the steam prior to its entry into the fuel bed and consequently results in a saving of fuel and in increase in the capacity of the plant.

A further object is to clean the checker brick which are within the carburetter and superheater, removing the carbon deposit therefrom and increasing the yield of gas. Hitherto the checker brick in the carburetter and superheater have become foul even when using a high grade oil after as little as 1200 hours of operation. The present process results in decreased maintenance cost and admits of the use as enriching material of the cheaper low grade oils.

A further advantage secured by the present invention resides in the fact that any kind of fuel may be used in the generator, instead of coke or anthracite coal. Heretofore the use of bituminous coal has been difficult because of the fouling of the carburetter and superheater resulting from its use and also because of the overheated condition of these parts. The backrun remedies these defects.

A further object of the invention is to provide for the recirculation of the backrun blue water gas through the entire set. By now increasing the volume of gases circulated through the machine a greatly increased capacity is attained with a consequent decrease in the cost of manufacturing the gas.

Further objects of the invention will appear hereinafter.

The invention may be more clearly understood by reference to the accompanying drawings in which is shown a preferred form of apparatus which may be used in carrying out the improved method, though it is to be understood that the method is adapted for use with various other forms of apparatus.

In the drawings:—

Figure 1:
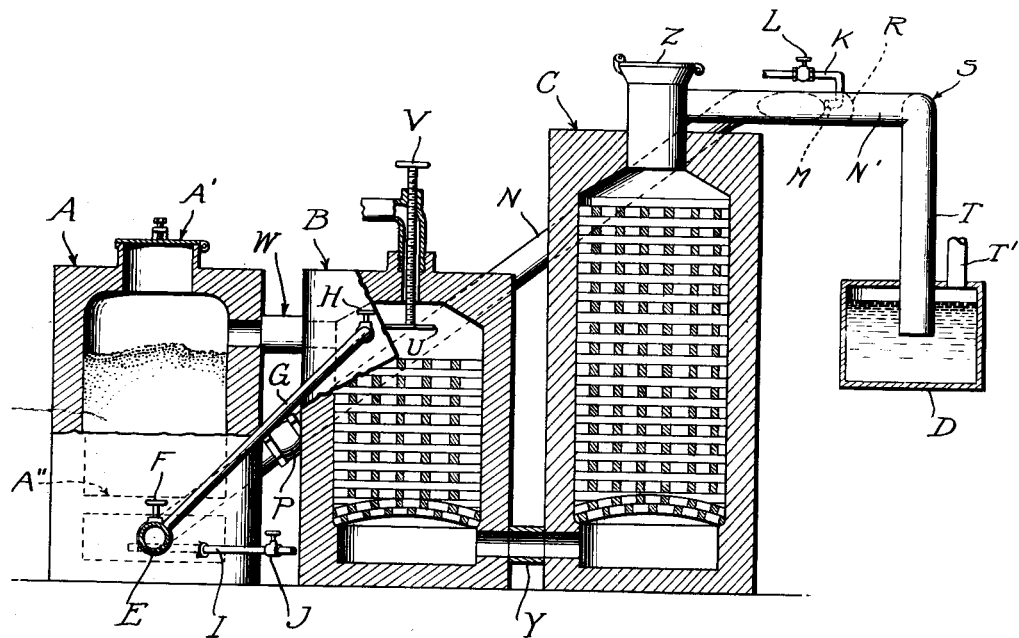
Fig. 1 is a view showing a water gas plant, parts being shown in vertical section and parts in elevation.
Figure 2:
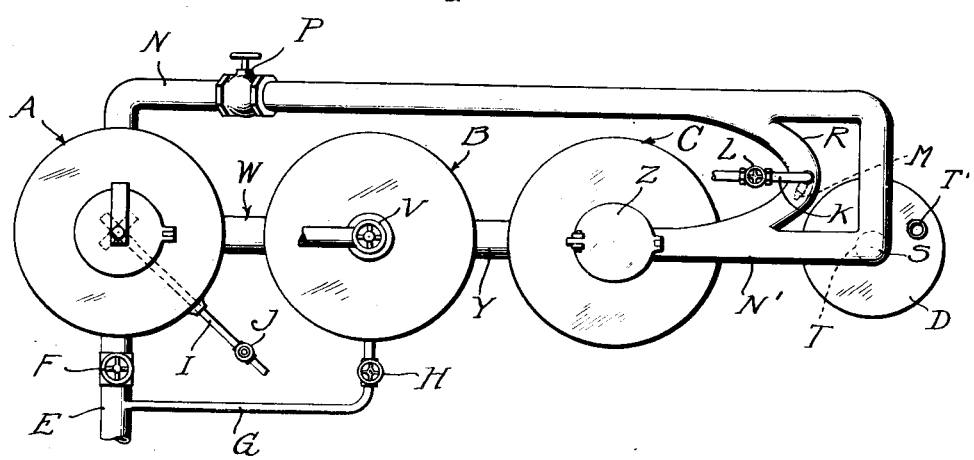
Fig. 2 is a top plan view of the plant.

Referring first to the apparatus shown in the drawings, the shells designated by the reference characters A, B, and C, are respectively the generator, carburetter, and superheater, of a carburetted water gas set. They may be arranged as shown or the carburetter and superheater may be combined in one shell or all three shells may be superimposed, or any other desired arrangement may be employed. D is the wash-box having a gas outlet T'.

Generator A is provided with the usual fuel charging door A' and with grates A", upon which the fuel rests as shown. There are ash removal doors under the grates (not shown).

Carburetter B is filled with checker brick as shown. It is provided with an oil spray U controlled by a valve V through which oil may be introduced.

Superheater C is filled with checker brick as shown. It also has a stack-cap Z.

Between the water gas generator A and carburetter B, there is an opening or connecting passage W, which is not obstructed in any way by a valve or other device. Between the carburetter and superheater there is a similar opening or connecting passage Y, similarly unobstructed.

Leading into the base of the generator A, under the grates A" is a pipe E through which air controlled by the valve F may pass. A similar pipe G provided with valve H leads to the top of the carburetter. A third air line might lead to the bottom of the superheater (not shown).

Also below the grates A" in the generator A there is introduced a pipe N provided with a valve P. This pipe is known as the backrun gas pipe. Similarly, from the top of the superheater C, there leads a gas offtake pipe, N'. Offtake pipe N' connects with backrun pipe N at S. S may be a T or cross or other suitable connection. From S a single pipe T leads to the wash-box D. Pipe N' may be provided with a butterfly or other valve if desired or required. Such a valve is not shown on the drawing. When the valve is not used there is, therefore, a free and unobstructed passage from under the grates A", through A, W, B, Y, C, N', S, and T to the wash-box D.

A by-pass connection R leads between offtake pipe N' and backrun pipe N. This by-pass R is inserted ahead of the connection S which has also been described as connecting pipes N and N'. By-pass R may be curved as shown or of any other shape suitable to the function performed by this by-pass as hereinafter described.

In the by-pass R is introduced a steam line as shown at K. Steam flow is controlled by valve L. The steam line K terminates in the nozzle M as shown.

Another steam line shown as I is introduced under the grates A" in the generator A. Steam flow through this line is controlled by the valve J.

In operating this set many procedures are at once apparent to those versed in the art. One method, known as a split-run, will be described.

The generator A is filled with fuel which may be any solid in any state of division, that is common to or possible of use in the manufacture of water gas. All valves except F, H, and Z are closed. If line N' is equipped with a valve, it remains open. The air passing into the generator and under the grates therein enters into primary combustion with the generator fuel. The air admitted to the top of the carburetter (and the bottom of the superheater, if so desired) enters into secondary combustion with the products of the primary combustion. The final combustion products pass out at the superheater stack Z. The result of this operation, which is known as the blast, is that the fuel bed in the generator is heated to incandescence and the checker brick in the carburetter and superheater have large quantities of heat stored in them. Blasting may be continued for as long as necessary, usually two or three minutes.

At the end of the blast, valve J is opened, and valves F, H, and Z closed. Valve V may also be opened. Steam is now being admitted at the base of the generator. Passing up through the fire bed, it is decomposed, forming blue water gas; containing principally hydrogen, carbon monoxide, a little carbon dioxide, and a small quantity of other constituents. The blue water gas passes into the top of the carburetter through the passage W. If valve V is open, oil is being admitted to the carburetter where the heat there stored cracks and vaporizes the oil into a combination of gases, in large part, hydrocarbons. This oil gas mixed with blue water gas becomes fixed as the gases pass down through the carburetter, through the passage Y, up through the superheater, through the pipes N' and T (some gas perhaps by-passing through R and N) and into the wash-box, from whence they pass to whatever place is desired. Such procedure is known as an up-run. The up-run may be continued as long as desirable. At its termination, valves J and V are closed and valves P and L opened. If used, the valve in N' is closed. A backrun is now starting. Steam admitted through the nozzle M passes through by-pass R into off-take pipe N' and thence into the top of the superheater, down through the superheater, through the passage Y and up through the carburetter and passage W into the top of the generator. In so doing, the steam has become superheated by heat transfer from the checker brick. Furthermore, by mechanical and chemical action, this steam has removed from the checker brick such ash and carbon as may have become deposited on them. Finally the checker brick, particularly at the top of the superheater, have become cooled.

The steam at the generator passes down through the incandescent firebed and becomes decomposed into blue water gas which passes out at the base of the generator into the backrun pipe N and thence through pipe T into the wash-box.

The introduction of steam at M, however, in this manner causes a portion of the gas in the backrun pipe N to be by-passed through the pipe R from whence it accompanies the steam and is recirculated through the set. This recirculation depends upon the extent of the injector action of the steam flowing through the nozzle M, upon the velocity heads of the various gases involved and upon the pressure conditions in the set. The act of recirculation, however, has a most important and beneficial effect upon the economical operation of the set in the manufacture of carburetter water gas.

First, a larger volume and weight of gases is passed through the superheater and carburetter than if steam alone were so passed thereby transferring to the generator where it can do useful work heat contained in the superheater and carburetter otherwise wasted.

Second, when blue water gas is passed a second time through the firebed, the carbon dioxide contained therein is afforded another opportunity to become reduced to the more valuable carbon monoxide.

Third, the capacity of the set is greatly increased as will be shown in the following discussion. When steam reacts with incandescent carbon, two main reactions are possible according to the temperature and concentration of the reacting substances.

$$H_2O + C = CO + H_2$$
$$2H_2O + C = CO_2 + 2H_2.$$

The first of these two is the one most desired in making carburetted water gas.

Maximum capacity, among other things, requires maximum passage of steam. The amount of steam possible to be used, however, is limited by a further reaction $$H_2O + CO = CO_2 + H_2.$$

Too much steam, therefore, results in the formation of carbon dioxide, so undesirable as to limit the amount of steam usable and, with it, the capacity of the set.

Recirculation of considerable portions of the backrun gas permits of the use of excess steam and the attainment of increased capacity because when carbon dioxide is formed, it is later reduced to carbon monoxide by again passing through the firebed and coming in contact with incandescent carbon, thus $$CO_2 + C = 2CO.$$

Fourth, inasmuch as in any water gas set, steam in excess of that theoretically acquired must be used, there is always an excess of steam which passes undecomposed through the firebed. Recirculation, however, provides for a repassage of some of this steam through the firebed thus reducing the amount of steam which must be supplied from the boilers.

Fifth, there is a reaction between the superheated backrun steam and recirculated backrun blue water gas whereby carbon dioxide is formed from the carbon monoxide of the blue gas. This reaction takes place in the superheater and carburetter before the gases reach the generator; thus $$CO + H_2O = CO_2 + H_2.$$

The carbon dioxide formed is later reduced to carbon monoxide by passage through the firebed. Because of this reaction, however, the gas making portion of the set is thereby increased to include the carburetter and superheater as well as the generator, hence, increasing the capacity of the set.

With this understanding of the backrun, a further description of the operation may be made. When the backrun has proceeded for such length of time as may be desirable, for instance, two minutes, valves P and L are closed and valve J opened. If used, the valve in N' is opened. Another steam up-run is now in operation. Valve V may be opened and oil admitted but this procedure on this up-run is not preferred. This up-run continues as desired, preferably for from 5 to 15 seconds, when the firebed has become so cooled from the endothermic reactions due to the passage of steam, that the blast must be again used. Valve J is therefore closed and valves F, H, and Z opened. The cycle can now be repeated.

There have been described preferred or specific embodiments of the invention in which the volume of the gases passing through the gas making apparatus is increased preferably by recirculating a portion of the generated water gas. The function of this increased volume of circulated gases is to more efficiently utilize the heat stored within the generator, carburetor and/or superheater, and to employ such heat for converting carbonaceous fuel into combustible gaseous products. The use of a portion of the generated gas is preferred for this purpose for two reasons, first, because such gas is readily available, and second, because the repassing of the gas through the fuel bed improves the quality of the recirculated gas.

Other gases, however, than the generated water gas may be employed as diluents for the steam, as for example, natural gas, hydrogen, nitrogen or air. The steam employed may be either superheated or not, as desired.

While my improvement is particularly designed for its beneficial effects in connection with the manufacture of carburetted water gas, it is nevertheless applicable to any three-cycle water gas process, which cycles consist first in air blasting the fuel bed of the generator and storing the resulting heat in the heat interchanger chamber or chambers, then making a forward steam run, the steam passing successively through the generator, whereby water gas is produced, and then through the heat interchangers. The third cycle, which may follow or precede the forward run just described, comprises introducing a mixture of steam and other gas into the set, preferably at such point that it is highly heated prior to its entrance into the reacting zone of the generator. This mixture is passed through the fuel bed of the generator and the principal portion of the resulting combustible gas withdrawn directly from the generator to a place of storage or use, while a part of such gas may be recirculated through the apparatus.

The term "gas" is used herein as employed in its broadest sense, referring to the gaseous state, and includes both vapors and fixed gases. Consequently, where the term "other gas" is employed in connection with steam, it is not intended to imply that the steam is superheated or dissociated, but the term "other gas" is used merely for the purpose of distinguishing from steam, which, broadly considered, is in the gaseous state.

Where recirculation is employed, gases other than steam may be introduced into the set in the first instance, as for example, hydrogen, nitrogen, carbon dioxide, or the like, as clearly set forth in copending application of Daniel J. Young, Serial No. 570,207, filed June 22, 1922. Such gases may be passed successively through the heat interchangers and the fuel bed of the generator, the resulting gas being withdrawn directly from the generator and separated into two portions, one portion of which is passed directly to the place of storage or use and the other portion being recirculated in the manner previously described.

Any type of solid carbonaceous fuel may be employed in the generator, as for example, coal, coke, oil shale, peat, lignite or the like, although for many purposes coal or coke are preferred.

The operation as herein outlined is merely an example. It is clear that the air blast may be followed by a steam up-run, which is immediately followed by another blast, or the blast may be followed by a steam backrun, then by an up-run and the bast then put on. Any cycle that seems desirable may be used.

Fuel may be charged into the generator every five or six cycles, or after any number of steam runs as seems desirable. It may, if means are provided, be charged continuously.

The oil admitted to the carburetter to be vaporized, cracked and fixed as oil gas to carburet the blue water gas may be of any quality because of the cleansing action of the backrun steam on the checker brick.

The improved process is adapted to be used cheaply in many existing carburetted water gas plants, slight modifications only being required. This reduces the cost of installing the system in an existing plant and makes the wide use of the backrun possible.

The invention results further in a reduction of sensible heat loss. Heretofore the gases generated both during the air blasting and steam periods, have left the superheater at 1300°–1400° F. According to the present process they leave the superheater at 900°–1000° F. and the base of the generator at 200°–300° F. These low temperatures of the outgoing make-gases materially decrease the subsequent cooling problem with respect to these gases.

It is obvious that many changes in various details may be made without departing from the spirit of the invention the scope of which is to be limited only by the appended claims.

For example, a two shell instead of a three shell set may be used or the number of shells may be increased beyond three, if desired. Furthermore, while the best results have in practice been obtained by locating the steam jet M beyond the superheater of a three shell set as herein shown and described, the jet may be located beyond the carburetter if desired or in a set of more than three shells it may be located just beyond any particular one of the shells. If desired the jet M may be located in the offtake N' from the superheater C in which case the by-pass R is eliminated and no valve of any kind can be used in the offtake N'. The preferable arrangement, however, provides for the by-pass R with the jet M located therein and such arrangement may be used either with or without a valve in the offtake N'.

It will also be noted that in this preferable arrangement the jet M is not necessarily directed toward the generator or toward any one of the shells but is directed at an angle to the offtake passage of the adjacent shell, as, for instance, the passage N' in the construction shown. This arrangement facilitates the withdrawal of a portion of gas from the backrun pipe N without interfering with the flow of the remainder to the wash-box D. It also permits of the passage of all of the admitted steam in a direction away from the wash-box.

I claim:—

1. The improvement in the process of making carburetted water gas, which consists in varying the water gas making run by at intervals passing a mixture of combustible gas and steam successively through a single superheater, a single carburetter and through a solid fuel bed in a single generator whereby water gas is generated.

2. The improvement in the process of making carburetted water gas, which consists in varying the water gas making run through a generator having a solid fuel bed, carburetter and superheater, by at intervals, reversing the flow through the entire set by passing a mixture of steam and other gas successively through the same superheater, carburetter and generator, then withdrawing combustible gas directly from the bottom of the generator.

3. A process of making combustible gas, which comprises air blasting a solid fuel bed in a generator and storing the resulting heat in a heat interchanger, then in a backrun supplying a mixture of steam and water gas to the heat interchanger, thereby superheating said mixture, passing the superheated mixture through the entire length of the fuel bed of the generator, withdrawing the resulting combustible gas directly from the generator without further heat treatment, and alternately with the backrun making a forward run, which comprises passing steam successively through the fuel bed of the generator and the heat interchanger, and withdrawing water gas directly from the heat interchanger.

4. A process of making combustible gas, which comprises air blasting a generator having a solid fuel bed, and storing the resulting heat in a primary and a secondary heat interchanger, then in a second cycle introducing a gas capable of reacting with the fuel in the generator, passing said gas through said fuel bed and withdrawing the combustible gas thus generated from the generator, separating a portion of said gas, and repassing it successively through the secondary and the primary heat interchangers and through the entire length of the fuel bed of the generator, withdrawing the resulting gas from the generator and alternately with the second cycle making a third run, which comprises passing steam successively through the generator, the primary heat interchanger, and the secondary heat interchanger, and withdrawing water gas directly from the secondary heat interchanger.

5. The improvement in the process of making carburetted water gas, which consists in varying the water gas making run by at intervals passing steam successively through a superheater, carburetter and through a solid fuel bed in a generator, separating a portion of the gas thus generated, and repassing it, together with steam, through the same superheater, carburetter and generator, and withdrawing the resulting combustible gas directly from the generator for storage or use.

6. A process of making combustible gas, which comprises air blasting a generator having a solid fuel bed and storing the resulting heat in a heat interchanger, then in a second cycle supplying gas at such point that it is highly heated on its entrance into the reaction zone of the fuel bed of the generator, passing said gas through the fuel bed of the generator, withdrawing the combustible gas thus generated directly from the generator, separating a portion of said gas and repassing such portion successively through the heat interchanger and through the entire length of the fuel bed of the generator, withdrawing the resulting gas directly from the generator and alternately with the second cycle making a forward run, which comprises passing steam successively through the generator and heat interchanger, and withdrawing water gas directly from the heat interchanger.

7. A process of making carbureted water gas which, when carried out in an apparatus comprising a single generator having a solid fuel bed, a single carburetor, and a single superheater, comprises air blasting the fuel bed of the generator to incandescence, and storing the heat of the resulting blast gases in the carburetor and superheater, then making a forward steam run, which comprises passing steam successively through the generator, carburetor, and superheater, adding enriching material during said forward run, and alternately with the forward run making a third run, which comprises introducing a mixture of steam and other gas into the set, passing such mixture through the fuel bed of the generator, and withdrawing the resulting combustible gas directly from the generator.

In testimony whereof I hereunto set my hand this 13th day of April, 1923.

GEORGE E. WHITWELL.